(12) United States Patent
Freire et al.

(10) Patent No.: US 12,341,445 B2
(45) Date of Patent: Jun. 24, 2025

(54) POSITION OBSERVER SYNCHRONIZATION FOR THREE-PHASE GENERATORS

(71) Applicant: Siemens Gamesa Renewable Energy A/S, Brande (DK)

(72) Inventors: Nuno Miguel Amaral Freire, Brande (DK); Paul Godridge, Cheadle (GB); Zhan-Yuan Wu, Sheffield (GB)

(73) Assignee: Siemens Gamesa Renewable Energy A/S, Brande (DK)

( * ) Notice: Subject to any disclaimer, the term of this patent is extended or adjusted under 35 U.S.C. 154(b) by 88 days.

(21) Appl. No.: 18/221,758

(22) Filed: Jul. 13, 2023

(65) Prior Publication Data

US 2024/0030848 A1 Jan. 25, 2024

(30) Foreign Application Priority Data

Jul. 20, 2022 (EP) .................................... 22185938

(51) Int. Cl.
*H02P 21/13* (2006.01)
*H02K 7/18* (2006.01)
*H02P 21/18* (2016.01)

(52) U.S. Cl.
CPC ............. *H02P 21/13* (2013.01); *H02K 7/183* (2013.01); *H02P 21/18* (2016.02)

(58) Field of Classification Search
CPC .......... H02P 21/13; H02P 21/18; H02P 23/12; H02P 2101/15; H02P 2103/20; H02P 6/183; H02P 6/182; H02P 9/009; H02P 9/105; H02P 21/32; H02K 7/183

USPC ............................... 318/400.02, 400.01, 700
See application file for complete search history.

(56) References Cited

U.S. PATENT DOCUMENTS

| | | | | |
|---|---|---|---|---|
| 4,389,606 A * | 6/1983 | Detering | ................. | H02P 25/03 318/807 |
| 5,006,774 A * | 4/1991 | Rees | ....................... | H02P 25/03 318/722 |
| 7,915,847 B2 * | 3/2011 | Jeung | .................... | F04D 27/004 318/714 |
| 10,819,264 B1 * | 10/2020 | Bojoi | ...................... | H02P 21/18 |
| 2018/0105201 A1 | 4/2018 | Mori et al. | | |
| 2019/0238077 A1 | 8/2019 | Azar et al. | | |

OTHER PUBLICATIONS

Chen et al., "An extended electromotive force model for sensorless control of interior permanent-magnet synchronous motors," IEEE Trans. Ind. Elect., vol. 50, No. 2, pp. 288-295, Apr. 2003.
European Search Report issued on Jan. 9, 2023 for application No. 22185938.2.

* cited by examiner

*Primary Examiner* — David Luo
(74) *Attorney, Agent, or Firm* — Schmeiser, Olsen & Watts, LLP (57) ABSTRACT

A controller, a wind turbine and a method of operating an electrical synchronous machine, includes a rotor and a stator having a first winding set, the method including: using a first position observer configured to observe the first winding set in order to observe a first value of the rotor position; synchronizing the machine based on the first observed value or an external initial value of the rotor position.

14 Claims, 6 Drawing Sheets

POSITION OBSERVER SYNCHRONIZATION FOR THREE-PHASE GENERATORS

CROSS-REFERENCE TO RELATED APPLICATIONS

This application claims priority to EP Application No. 22185938.2, having a filing date of Jul. 20, 2022, the entire contents of which are hereby incorporated by reference.

FIELD OF TECHNOLOGY

The following relates to a method and a corresponding controller for controlling a multiple winding set electrical synchronous machine comprising a rotor and a stator having one or more than one winding set. Further, the following relates to a wind turbine comprising the multiple winding set electrical synchronous machine and the controller.

BACKGROUND

For controlling a synchronous generator, conventionally, transformations between different coordinate frames of electrical quantities are required. For example, transformation of three-phase voltage and/or current to a fixed alpha-beta frame or to a synchronously rotating dq-frame may be required during control methods. For the transformation between fixed coordinate frames and the synchronously rotating coordinate frame, like the dq-frame, the electrical rotor position is required, in particular for the park transformation and back transformation.

Conventionally, the determination of the electrical rotor position may have been performed employing measured voltages at the respective winding set of the generator which may be referred to as voltage sensored determination methodology. Alternatively, the rotor position has been determined without using measured voltage values which may be referred to as a voltage sensorless determination method, or saliency based high frequency injection (HFI) method.

Conventionally, a so-called EMF (electromagnetic force) observer has been employed for determining the electrical rotor position, for the sensorless and the sensored methodology, where the voltage inputs are from the voltage sensors. Conventionally, prior to the use of the estimated position from the respective EMF observer, a synchronization process may have been applied, by which the relationship between the generator voltages, currents and position is established from an initial state. The synchronization process may have in particular been supported by employing a set of generator voltage sensors, i.e., thereby performing a so-called voltage sensored synchronization. Alternatively, the synchronization may have been performed with a voltage sensorless approach.

Similarly, prior to the use of the estimated position from the HFI observer, a synchronization process may also have been applied, where the determination of an initial angle becomes important.

Nowadays, multiple winding set generators have come into usage. It has, however, been observed that determining the electrical rotor position for the multiple winding set generators and/or the controlling of the multiple winding set generators requires complex equipment and complex and time-consuming methods. Furthermore, it has been observed that, in particular due to erroneous determination of the electrical rotor position, undesired transient torques are generated or observed in the respective winding sets. Thereby, operation of the generator may have been impaired and performance is not satisfactory.

Thus, there may be a need for a method and a corresponding controller of controlling a multiple winding set electrical synchronous machine, wherein complexity of the required equipment is reduced, the method is simplified or furthermore, transients in undesired torque generation in the one or more winding sets are reduced. Furthermore, there is a need of such a method and controller, wherein performance of the wind turbine or the generator system in general is improved, while reducing complexity, furthermore it may be desired to improve reliability.

SUMMARY

According to an embodiment it is provided a method of controlling a, in particular multiple winding set, electrical synchronous machine comprising a rotor and a stator having a first winding set and in particular at least one second winding set, the method comprising using a first position observer; in particular EMF or HFI observer, configured to observe the first winding set in order to observe a first value of the rotor position; controlling (in particular synchronizing) the machine based on the first observed value or an external initial value of the rotor position.

The method may be implemented in software and/or hardware and/or the method may be performed for example by a controller according to an embodiment of the present invention, in particular a portion of a wind turbine controller. The electrical synchronous machine may be for example a wind turbine generator which is coupled to a hub at which plural rotor blades are mounted.

The rotor may be an inner rotor or an outer rotor. The rotor may comprise permanent magnets. The stator may comprise a stator yoke comprising plural teeth around or at which the multiple winding sets are wound.

The machine may comprise one or more than one winding sets, such as two, three, four, five, six or even more independent winding sets. Each winding set may provide multiple phases, such as three phases, four phases, five phases or even more phases. In particular, a one winding set or multiple winding set three-phase electrical synchronous machine may be provided according to an embodiment of the present invention.

Each winding set may be controlled independently from each other, in particular via a respective converter which is connected to the respective winding set. In one embodiment, to each winding set, a respective position (e.g. EMF or HFI) observer is associated which position observer determines the rotor (electrical) position (in particular independently from all other position observers).

The external initial value of the rotor position may be an azimuth angle as measured e.g. by an optical and/or mechanical rotor position sensor and/or Hall sensor.

According to another embodiment, to the first winding set a first position observer is associated and also to the other winding sets respective position observers are associated. In this embodiment, the rotor position as determined by the first position observer (also referred to as master position observer in the following) may be employed for synchronizing the one or more other position observers.

The first position (e.g. EMF) observer may comprise an input section which allows input of one or more electrical and/or mechanical quantities, for example measured quantities or estimated or observed quantities. The input parameters may for example comprise operational parameters (measured and/or estimated and/or derived) of the synchronous machine.

The first position (e.g. EMF) observer may output the first value of the rotor position which, at least after a particular time interval of running the first position observer, which corresponds substantially to the true rotor position. This first observed value of the rotor position (in particular corresponding to the true position) may then advantageously be used in order to control (voltages and/or currents) in the first winding set as well as for controlling (voltages and/or currents) in the at least one second winding set. Thereby, the first observed value of the rotor position may either directly be used for controlling the one or more other winding sets or may be indirectly used for controlling the one or more winding sets, in particular only during an initialization or synchronization or starting period.

When the first observed value of the rotor position is utilized for controlling the machine, it may not be required to for example have voltage sensors at winding sets other than the first winding set. Thereby, equipment complexity may be reduced. The first winding set may be controlled prior to controlling any of the at least one second winding set. However, the delay of controlling the at least one second winding set may be relatively short, such as less than 0.3 to e.g. 2 s.

When the first observed value of the rotor position is also utilized for controlling the at least one second winding set, transients in torques observed in conventional systems may be reduced.

According to an embodiment of the present invention, controlling the machine comprises controlling a first converter based on the first observed value of the rotor position, the first converter being connected to the first winding set; controlling and/or synchronizing a second converter based on the first observed value of the rotor position, the second converter being connected to the second winding set.

In case more than two winding sets are present, each may be connected to respective further converter and the method may include synchronizing and/or controlling one of more further converters based on the first observed value of the rotor position, the one or more converters being connected to one or more second winding sets, respectively.

The first converter as well as the second converter may each comprise an AC-DC portion, a DC link and a DC-AC portion and may both be configured to convert a variable frequency power stream (received from the respective winding set) to a substantially fixed frequency power stream and may then be supplied to a utility grid (in particular via at least one wind turbine transformer and/or a wind park transformer).

Controlling the respective converters may comprise to supply control signals to the converters, in particular to supply gate driver signals to respective gates of controllable switches which may be comprised in the converters. Employing the first converter as well as the second converter (and for each additional winding set an associated further converter) may simplify the method and may support conventional systems.

According to an embodiment of the present invention, controlling the machine comprises using a second position observer configured to observe the second winding set in order to, in particular independently from the first position observer, estimate a second observed value of the rotor position, thereby using the first observed value of rotor position as initial second observed rotor position for starting; controlling the second converter based on the second observed value of the rotor position.

According to this embodiment, to the second winding set, a second position observer is associated (and/or to each further winding set a further respective position observer may be associated). The second position observer may be provided for redundancy or fault tolerance, in order to, independently from the first position observer, also determine the rotor position which is then used to control the second winding set. The second position observer and all potentially other position observers may be referred to as slave position observers.

The slave position observers may receive the first observed value of the rotor position as provided by the first (master) position observer for initialization or synchronization or starting. After initialization/synchronization/starting, the slave observer(s) may then operate independently from the first (master) position observer.

By providing the redundancy, consistently checks may be provided or applied, involving comparing for example the first observed value of the rotor position with the second observed value of the rotor position.

The second converter may in particular be controlled based on the second observed value of the rotor position without (at least after starting) using the first observed value of the rotor position.

According to an embodiment of the present invention, the second position observer remains off till and is started at a second point in time, which is a time interval after starting the first EMF observer at a first point in time, the time interval being typically in 0.3~2 s, the method in particular further comprising: controlling the first converter starting at the first point in time; controlling the converter starting not earlier than at the second point in time.

The start of second observer may be enabled by state change in the first observer, instead of at a particular point in time. The synchronisation for the second observer may be enabled after the first observer is working and its converter current control is enabled.

The second position observer may already receive substantially as the true rotor position the first observed value which has been determined by the first position observer. However, if the second position observer substantially receives the true rotor position as initial rotor position, transients in torque generated by the second winding set may substantially be reduced or may substantially vanish. Thereby, reliability of operation of the electrical machine may be improved and transients in torque or undesired behaviour may be reduced.

According to an embodiment of the present invention, at the second point in time at least one of the following holds: synchronization of the first position observer is completed; the first position observer is in a running state, or speed observed; the first observed value of the rotor position observed by the first position observer substantially corresponds to the true value of the rotor position; torque can be produced by the first winding set on demand.

Thereby, it may be ensured that the first observed value of the rotor position can be relied on by the one or more slave position observers to correspond to the substantially true rotor position. Thereby controlling the machine may be improved.

According to an embodiment of the present invention, one or each of the first position observer and the second position observer comprises an EMF observer comprising: a sychronization module having as inputs at least one of the following: an observed rotor speed; an observed rotor position;

respective winding set voltage references to converter control (e.g required for derivation of control voltages in alpha-beta frame, which are then used as inputs to the EMF observer, in particular in a dq-frame; a rotor initial position for initializing the observer; a generator synchronous speed; sensed winding set voltages used in a sensed mode; a generator initial angle from sensed rotor azimuth position, Hall-sensor measurement, or a saliency based sensorless observer; the synchronization module having as outputs estimated winding voltages (or control voltages) in the fixed alpha-beta frame or the fixed abc-frame; an EMF observer module having as inputs at least one of the following: the estimated winding voltages, in particular in the fixed alpha-beta frame or the fixed abc-frame; measured winding currents, in particular in the fixed alpha-beta frame or the fixed abc-frame; the EMF observer module having as output at least the observed value of the rotor position, and observed value of rotor speed.

In other embodiments, the synchronization module and/or EMF observer module may be split or combined in other modules and/or the functionality of the synchronization module and the EMF observer module may be split or combined in other units. The synchronization module may be configured to perform a synchronization wherein the rotor electrical angle may be determined by use of voltage sensored method or voltage sensorless method.

The observed rotor speed and/or the observed rotor position may be derived internally at the respective EMF observer and may be fed back as some input. During operation of the respective EMF observers, not all inputs of the synchronization module may be supplied with electrical input signals. The input signals may be selected depending on the application and depending on a running state. For example, a rotor initial position does not need to be supplied to the master EMF observer, in the case that sensed winding voltages are input to the synchronization module. In contrast, if no sensed winding voltages are supplied as input to the synchronization module, at least a rotor initial position needs to be supplied, which, however, may be set to zero. Alternatively, the rotor initial position not being supplied explicitly to the synchronization module, may be assumed by the synchronization module to be zero or a predetermined value. To derive the estimated winding voltages, mathematical equations may be applied including some of the input signals, as will be explained in the detailed description below.

The EMF observer module may perform an observation process as conventionally known. A closed-loop observer is the typical technique for speed and position estimation, in which the machine voltage model is applied, with inputs of machine control voltages and phase currents in a stationary reference frame.

E.g. an observer as described in Z. Chen, M. Tomita, S. Doki, and S. Okuma, "An extended electromotive force model for sensorless control of interior permanent-magnet synchronous motors," IEEE Trans. Ind. Elect., vol. 50, no. 2, pp. 288-295, April 2003, may be employed.

Thereby, conventionally available modules, like EMF observers, may be supported.

According to an embodiment of the present invention, the first observed value of the rotor position output from the position observer module of the first position observer is used as input for the rotor initial position of the synchronization module of the second position observer.

When the first observed value of the rotor position output from the position observer module of the first position observer is used as input for the rotor initial position of the synchronization module of the second position observer, the second position observer may already receive a substantially true rotor position for initialization and/or synchronization. In the synchronization of the second position observer, in particular, EMF observer, where for calculation of the generator voltages in the stationary reference frame, the electrical angle from the first position observer may be used directly; or the electrical angle is derived by integrating the generator synchronous speed, starting from the correct initial value provided from the first position observer. Thus, the electrical angle, also independently from the master position observer as derived by the second position observer, may be reliable and may reflect the true rotor position. Thus, also controlling the second winding set may be improved.

According to an embodiment of the present invention, one or each of the first position observer and the second position observer comprises a HFI observer.

The HFI-observer is another example of a position observer that (as the EMF observer) may require an initial angle as input and outputs the true position angle. This may be the case of synchronisation for a single or multiple winding machine, where the initial angle can be provided from an external source such as Azimuth angle, or from the master channel if it's a multiple winding machine.

According to an embodiment of the present invention, at least the first observed value of the rotor position output from the observer module of the first position observer is used as input for the rotor initial position of the synchronization module of the second position observer.

According to an embodiment of the present invention, at least the first EMF observer can be operated in: a voltage sensorless mode, in which the generator synchronous speed and a predetermined initial rotor position, in particular equal to zero, are used as synchronization module inputs, without supplying sensed winding voltages as input; as an alternative to a voltage sensored mode, in which sensed winding voltages of the respective winding set are used as synchronization module inputs.

Thereby, conventionally available EMF observers may be supported. The respective EMF observer may also have an input allowing to set the respective EMF observer into the voltage sensorless mode or the voltage sensored mode, as desired, for example as is dependent on the available equipment, in particular voltage sensors.

According to an embodiment of the present invention, at least the first EMF observer can be operated in: a voltage sensorless mode, in which the sensed rotor azimuth position is used as the initial angle in synchronization module, that is, the electrical angle is derived by integrating the generator synchronous speed, starting from the initial value converted from rotor azimuth position.

The rotor azimuth sensor may be configured to measure or determine or sense the mechanical rotor azimuth position or angle. The rotor azimuth sensor may for example comprise an encoding sensor. The generator electrical rotor position is proportional to the rotor azimuth position (by a ratio of the generator pole-pair number), and with a given assembly of rotor and generator the electrical rotor position can be unambiguously derivable from the rotor azimuth position.

When the first EMF observer is in the voltage sensorless mode with supplement of rotor azimuth angle, the first EMF observer may not receive sensed winding voltages at the input.

The first position (EMF) observer may also operate in voltage sensorless mode with the initial angle being provided from other source(s), for example, Hall-effect sensors, or generator saliency based high frequency injection sensorless observers.

According to an embodiment of the present invention, the first EMF observer is operated in the voltage sensorless mode or sensored mode, wherein the second EMF observer is operated in the voltage sensorless mode.

When the second EMF observer is operated in the voltage sensorless mode, no voltage sensors are required for measuring respective voltages at the second winding set. Thereby, complexity may be reduced.

Although, during the synchronization process of the first EMF observer, a voltage or torque transient may be observed (due to operating the first winding set), a respective transient may not be observed for operating the second winding set, such that the transient in torque may be at an acceptable level.

When the first EMF observer is operated in the sensored mode, voltage sensors may be required to measure the voltages at the first winding set, however, transients in torque caused by operation of the first winding set may be essentially zero, since from the start of operating the first EMF observer and controlling the first winding set, the rotor position may correspond to the true rotor position.

When the first EMF observer is operated in the voltage sensorless mode, with the generator initial angle being predetermined (other than 0) from a second source such as azimuth angle, Hall sensors and HFI observers, transients in torque caused by operation of the first winding set may be substantially reduced, since from the start of operating the first EMF observer and controlling the first winding set, the rotor position may be close to the true rotor position.

According to an embodiment of the present invention, the first position observer comprises a first HFI observer, wherein the generator initial angle being predetermined (other than zero) from a second source such as azimuth angle and/or Hall sensor(s), wherein transients in torque caused by operation of the first winding set may be substantially reduced, since from the start of operating the first HFI observer and controlling the first winding set, the rotor position may be close to the true rotor position.

According to an embodiment of the present invention the first HFI position observer may be momentarily enabled when the generator is stationary or running at low speed, or in the state when a little transient in torque has the least effect, so that the generator electrical angle is observed. This angle, together with the synchronous speed from the turbine controller, can be used to track the generator electrical position, and to provide the initial angle for the position observer (EMF or HFI) when it is ready for the observer to be synchronised.

When the correct initial angle for an HFI observer is used, the action for polarity detection may be saved during synchronisation of the HFI observers.

According to an embodiment of the present invention, the first observed value of the rotor position and/or the second observed value of the rotor position is an electrical position of the rotor. Thereby, the quantity which is used for transforming electrical quantities may be provided in a reliable manner.

According to an embodiment of the present invention, the machine is a permanent magnet synchronous machine. Thereby, conventionally available generators may be supported.

It should be understood, that features, individually or in any combination, disclosed, applied, explained or provided for a method of controlling a multiple winding set electrical synchronous machine may also, individually or in any combination, applied for or provided or employed for a respective controller for controlling a multiple winding set electrical synchronous machine, according to embodiments of the present invention and vice versa.

According to an embodiment of the present invention it is provided a controller for controlling a, in particular multiple winding set, electrical synchronous machine, in particular of a wind turbine, comprising a rotor and a stator having a first winding set and in particular at least one second winding set, the controller comprising: a first position observer configured to observe the first winding set in order to observe a first value of the rotor position; a control portion configured to control and/or synchronize the machine based on the first observed value or an external initial value of the rotor position, the control portion in particular comprising: a second position observer configured for the second winding set in order to observe a second value of the rotor position, thereby using the first observed value of the rotor position for starting.

The controller may be implemented in software and/or hardware and/or may be a part or a portion of a for example wind turbine controller.

According to an embodiment it is provided a wind turbine, comprising: a, in particular multiple winding set, electrical synchronous machine comprising a rotor and a stator having a first winding set and in particular at least one second winding set, the rotor being coupled to a hub at which plural rotor blades are mounted; in particular a first converter connected to the first winding set and a second converter connected to the second winding set; a controller according to the preceding embodiment, connected to control the machine, in particular via the first converter and the second converter.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
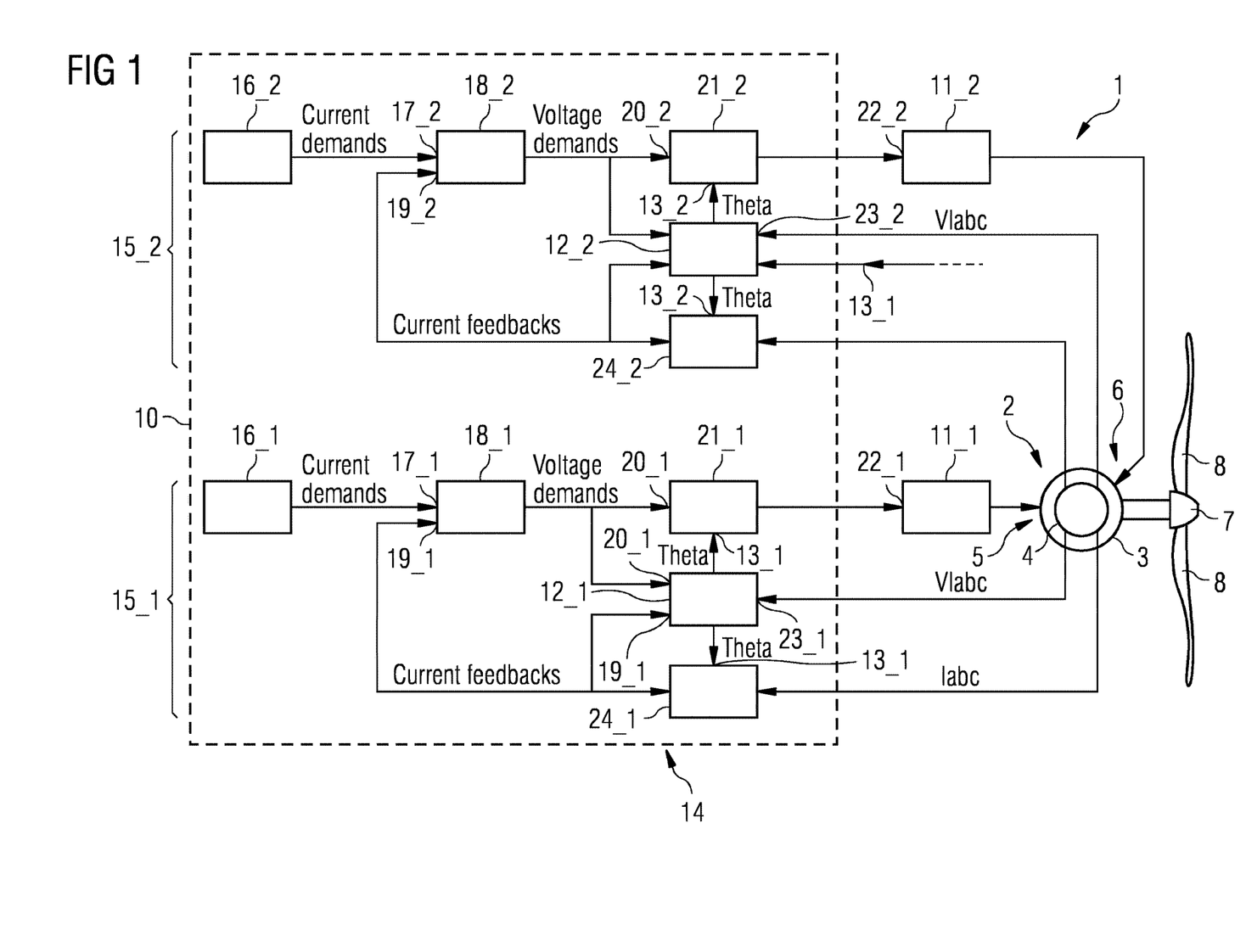
FIG. 1 schematically illustrates a wind turbine according to an embodiment of the present invention.

The wind turbine 1 schematically illustrated in FIG. 1 comprises a multiple winding set electrical synchronous machine 2 comprising a rotor 3 and a stator 4 having a first winding set 5 and having at least one second winding set 6, wherein the winding sets 5, 6 comprise multiple phase winding sets which are wound around not in detail illustrated teeth of the stator 4. The rotor 3 of the machine 2 is coupled to a hub 7 to which plural rotor blades 8 are mounted. The machine 2 illustrated in FIG. 1 is a permanent magnet synchronous machine with an outer rotor 3.

The controller 10 is a controller for controlling a multiple winding set electrical synchronous machine, for example the machine 2, according to an embodiment of the present invention. The wind turbine 1 comprises the controller 10 which is connected to the machine 2 to control the machine 2. In the illustrated embodiment, the synchronous machine 2 is controlled via a first converter 11_1 which is connected to the first winding set 5 and via a second converter 11_2 which is connected to the second winding set 6. The first converter 11_1 and the second converter 11_2 are also comprised in the wind turbine 1.

The controller 10 comprises a first EMF observer 12_1 which is configured to observe the first winding set 5, in order to observe a first value of the rotor position indicated with reference sign 13_1. The controller 10 further comprises a control portion 14 comprising plural other components of the controller which is configured to control the machine 2 based on the first observed value 13_1 of the rotor position. Thereby, the control portion 14 in particular comprises a second position observer 12_2 which is configured to observe the second winding set 6 in order to observe a second value 13_2 of the rotor position, thereby using the first observed value 13_1 of the rotor position, in particular for synchronization/initialization.

The first observed value 13_1 and/or the second observed value 13_2 of the rotor position is thereby an electrical position of the rotor 3. The controller 10 illustrated in FIG. 1 is configured to carry out a method of controlling the multiple winding set electrical synchronous machine 2 according to an embodiment of the present invention.

Thereby, the first position observer 12_1 is configured to observe the first winding set 5, in order to estimate the first observed value 13_1 of the rotor position. Further, during the control method, the machine is controlled based on the first observed value 13_1 of the rotor position. In particular, the control method involves to control the first converter 11_1 based on the first observed value 13_1 of the rotor position, wherein the first converter 11_1 is connected to the first winding set 5. The method further comprises to control the second converter 11_2 based on the first observed value 13_1 of the rotor position, wherein the second converter is connected to the second winding set 6.

In particular, for controlling the second converter, the second position observer 11_2 is configured to observe the second winding set 6 in order to observe a second value 13_2 of the rotor position, thereby using the first observed value 13_1 of the rotor position as an initial second observed rotor position. The method comprises further to control the second converter 11_2 based on the second observed value 13_2 of the rotor position.

FIG. 1 thereby illustrates an overall control system, where the generator rotor electrical position is estimated first by the first position observer 12_1 (also referred to as master observer).

The controller 10 may be considered as substantially formed by a duplicate of a particular controller portion namely portion 15_1 which has similar or even identical structure as a control portion 15_2. The separate control portions 15_1 and 15_2 enable to control the first winding set 5 and the second winding set 6 via the first converter 11_1 and the second converter 11_2 in an independent manner. The control portions 15_1, 15_2 comprise similar or same control units or modules labelled in FIG. 1 ending either with a "1" or "2".

The first control portion 15_1 comprises a current reference generation module 16_1 which outputs current demands 17_1 which are supplied to a current controller 18_1. The current controller 18_1 receives current feedback signals 19_1 representing transformed currents of the first winding set. The current controller 18_1 outputs voltage demands 20_1 based on the inputs 17_1, 19_1.

The voltage demands 20_1 are supplied to a pulse width modulation module 21_1 which further receives the first value of an observed rotor position 13_1. The PWM modulator 21_1 outputs control signals 22_1 which are received by the first converter 11_1. The first position observer 12_1 (in particular, EMF observer) also receives the voltage commands 20_1 and also receives the current feedbacks 19_1. Furthermore, the first position observer 12_1 (in particular, EMF observer) receives optionally winding voltages 23_1 representing measurements of voltages at the first winding set 5. A transformation module 24_1 receives the first value 13_1 of the rotor position in order to perform a transformation between for example a fixed coordinate frame and a synchronously rotating coordinate frame.

The second control portion 15_2 comprises a current reference generation module 16_2 which outputs current demands 17_2 which are supplied to a current controller 18_2. The current controller 18_2 receives current feedback signals 19_2 representing transformed currents of the second winding set. The current controller 18_2 outputs voltage demands 20_2 based on the inputs 17_2, 19_2.

The voltage demands 20_2 are supplied to a pulse width modulation module 21_2 which further receives the second value of an observed rotor position 13_2. Using the value 13_2 of the rotor position, the PWM modulator 21_2 outputs control signals 22_2 which are received by the second converter 11_2. The second position observer 12_2 (in particular, EMF observer) receives the voltage commands 20_2 and also receives the current feedbacks 19_2. Optionally, the second position observer 12_2 (in particular, EMF observer) receives (in the sensored mode) winding voltages 23_2 representing measurements of voltages at the second winding set 6. A transformation module 24_2 receives the second value 13_2 of the rotor position in order to perform a transformation between for example a fixed coordinate frame and a synchronously rotating coordinate frame.

As is indicated at an input of the second position observer 12_2, the second position observer 12_2 receives, during at least initialization or synchronization, the first value 13_1 of the rotor position which is output by the first position observer 12_1.

Figure 2:
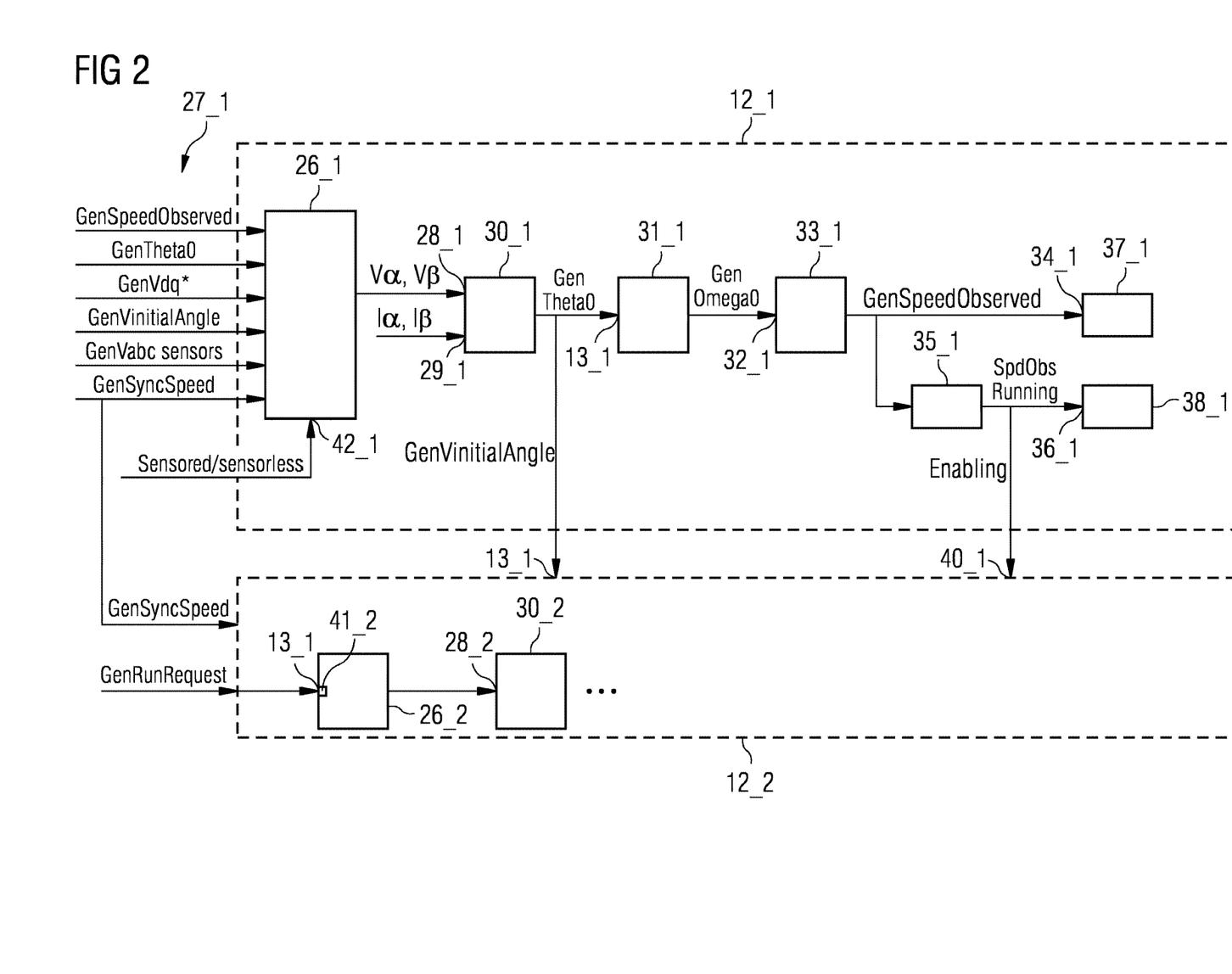
FIG. 2 schematically illustrates an EMF observer which may be comprised in a controller according to an embodiment of the present invention.

Some of the internal functions of the EMF based position observer are shown in FIG. 2, and in particular, the synchronisation process is illustrated. FIG. 2 illustrates the first EMF observer 12_1 together with the second EMF observer 12_2 in more detail. The second EMF observer 12_2 may be configured similar or even identical to the first EMF observer 12_1.

The first EMF observer 12_1 comprises a synchronization module 26_1 which has inputs 27_1 comprising an observed rotor speed, an observed rotor position, respective winding set voltage references, a rotor initial position for initializing the observer, a generator synchronous speed, and winding voltages of the first winding set. The synchronization module 26_1 outputs the estimated winding voltages 28_1 for example in the fixed alpha-beta frame or in the fixed abc-frame.

The first EMF observer 12_1 is an example of a first position observer. In another implementation of the first position observer, like HFI observer, other parameters may be output, like the electrical position and/or speed. Accordingly, the synchronization process illustrated in FIGS. 2 and 9 may differ. However, for synchronizing, an initial electrical angle needs to be known in position observers.

Therefore, the position observers 12_1 and 12_2 may be referred to as EMF observer or HFI observer wherever applicable.

The estimated winding voltages 28_1 together with measured currents 29_1 are supplied to an EMF observer module 30_1. From the inputs and potentially other parameters, the EMF observer module 30_1 derives the first value 13_1 of the rotor position.

This first value 13_1 of the rotor position is provided to the second EMF observer 12_2 as a rotor position or an initial rotor position which is supplied to the respective generator initial angle or rotor initial angle input of the synchronization module 26_2 of the second EMF observer 12_2.

In the first EMF observer 12_1 the estimated first value 13_1 of the rotor position is provided to a derivative module 31_1 which outputs a raw value of the rotational speed or a raw value of the observed generator speed. A stable check module 33_1 checks the stability of the rotational speed and outputs an observed generator speed or an observed rotor speed 34_1 which is then fed back as an input to the synchronization module 26_1.

A voltage ramp and delay module 35_1 also receives the flag of generator speed observed 34_1 and outputs a signal 36_1 as an indication that the observer synchronisation process has been completed and the observed is ready for use in generator control, etc.

The flag of generator speed observed 34_1 is provided to an enable module 37_1 which enables the generator current control and pulse width modulation. Further, enable element 38_1 receives the signal 36_1 and enables the generator control.

The signal 36_1 may indicate that the first EMF observer 12_1 is in a running state and/or that initialization or synchronization is completed. In this case, it is also assured that the derived first value 13_1 of the rotor position represents substantially the true rotor position. In this case, an enabling signal 40_1 is set to true and input to the second EMF observer 12_2. The enabling signal 40_1 causes the second EMF observer 12_2 to start observing the rotor position.

For starting the observation of the rotor position by the second EMF observer 12_2, the second EMF observer 12_2 utilizes the first value 13_1 of the rotor position as an input to its synchronization module 26_2. The rotor initial position input of the synchronization module is labelled with reference sign 41_2 in FIG. 2.

The respective synchronization module 26_1 further comprise a switching input 42_1 which enables to switch between a voltage sensored or a sensorless operation mode. In the voltage sensorless operation mode, into which the synchronization module 26_2 of the second EMF observer 12_2 is set, the rotor initial position input 41_2 is utilized to which the first value 13_1 of the rotor position as determined by the first EMF observer 12_1 is supplied.

If the mode of "sensored" synchronisation is selected for the master EMF observer 12_1, the inputs from voltage sensors are used for calculation of Vα and Vβ, which are fed to the EMF observer module for position estimation, $$\begin{cases} V_\alpha = \frac{2}{3}\left(V_a - \frac{1}{2}V_b - \frac{1}{2}V_c\right) \\ V_\beta = \frac{2}{3}\left(\frac{\sqrt{3}}{2}V_b - \frac{\sqrt{3}}{2}V_c\right) \end{cases} \quad (1)$$

As the measurement voltages provide the true rotor electrical position, at enabling of current control and PWM output, the supplied voltages to the generator would be the desired ones, and thus there will be little transient from the synchronisation, or little transient in the generator torque.

When the voltage sensorless method is applied for the first observer 12_1, the generator speed from the turbine controller will be used for derivation of Vα and Vβ that are required by the EMF observer, $$\begin{cases} V_\alpha = \gamma \cdot \sqrt{2}\,\omega_e \psi_{pm}\cos(\omega_e t) \\ V_\beta = \gamma \cdot \sqrt{2}\,\omega_e \psi_{pm}\cos\left(\omega_e t - \frac{\pi}{2}\right) \end{cases} \quad (2)$$

In the above equation, two orthogonal signals are created by using the generator synchronous speed input as the frequency ωe, and by default the initial angle is assumed 0. The amplitude of the voltages is to match with the generator back EMF, and thus the generator PM flux linkage ψpm is used in the calculation. A coefficient γ is applied, which is a small number up to 1, such that the supplied voltage to the generator would be scaled down, in consideration that the voltages given in Eq. 2 could be completely out of phase. Subsequently a voltage ramp-up process 35_1 is arranged to resume the voltage to its desired level.

As the real rotor electrical position is uncertain, the initial voltage angle for sensorless synchronization (of the first observer 12_1) has to be set to a value such as 0 and accordingly the voltage amplitude has to be lowered. As a result, during the initial period of current and PWM control, there would be transients in generator torque for the first winding set. Shortly afterward (a fraction of one second), the angle is corrected by the first EMF observer 12_1, i.e., the first observer value 13_1 of rotor electrical position becomes certain. Therefore, for a multiple three-phase generator, instead of handling the multiple channels identically, one channel (first winding set; first converter; first EMF observer) can be named the master and its synchronization can be started first, and then the synchronization for the rest channels (slaves, second winding set; second converter; second EMF observer) is enabled after completion of the master channel, from which the observed position (13_1) is to be used as the voltage initial angle. This being the case, the torque transient would only appear at the synchronization of one channel, and in comparison with the conventional method, the level of transient would be halved for a dual three-phase generator, and quartered for a quad three-phase machine.

Moreover, if the voltage sensored synchronization (for the master) is a necessity, only one set of voltage sensors (namely at the first winding set) will be sufficient. In other words, the master channel can run with sensored or sensorless synchronization, and the slave channels can be configurated with sensorless synchronization only.

A diagram is shown in FIG. 2 for the proposed schemes of synchronization, or master-slave synchronisation. The system has a master channel (12_1) and one or a few slave channels (12_2, . . . ). The master channel can run with voltage sensors or without (sensorless), whilst there is no need of voltage sensors for the slave channels, i.e., they are always operated in sensorless mode. At command of generator run request, the master channel will start, but the slave channels will wait until the EMF observer of master channel is in running state, and then the observed angle from master can be used as the initial voltage angle for the slave channels.

$$\begin{cases} V_\alpha = \gamma \cdot \sqrt{2}\,\omega_e \psi_{pm} \cos(\omega_e t) \\ V_\beta = \gamma \cdot \sqrt{2}\,\omega_e \psi_{pm} \cos\left(\omega_e t - \frac{\pi}{2} + \theta_0\right) \end{cases} \quad (3)$$

Where θ0 is the initial angle in slave channel, which is obtained from the observed angle in master channel after its flag of observer running state changes from false to true.

Alternatively, in Eq (3), the angle from master channel can be used directly, save the information of GenSyncSpeed to the slave channels.

It may be noted that as the correct initial angle is used, there is no need of voltage scaling-down, i.e., γ=1, and a very fast ramp up rate for the Vq feedforward term can be applied. The parameter setting for the master channel should remain.

Figure 3:
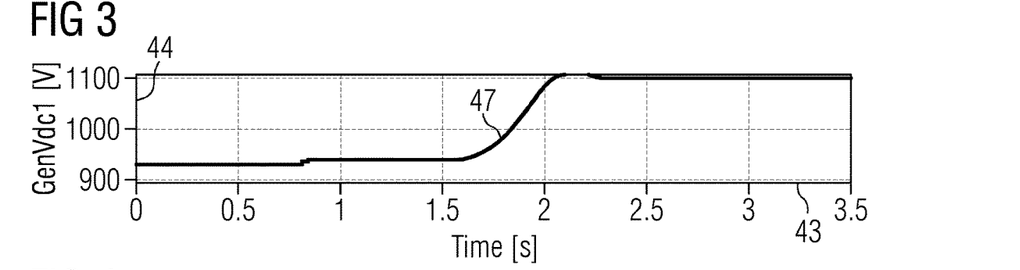
FIG. 3 illustrates a graph showing simulation or experimental results when a machine is controlled according to embodiments of the present invention.
Figure 4:
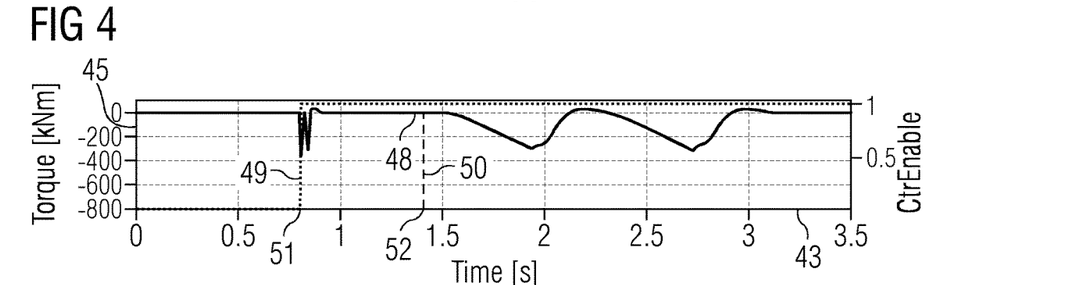
FIG. 4 illustrates a graph showing simulation or experimental results when a machine is controlled according to embodiments of the present invention.
Figure 5:
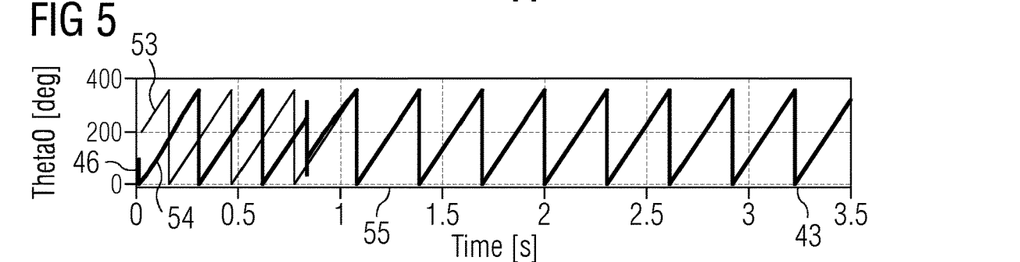
FIG. 5 illustrates a graph showing simulation or experimental results when a machine is controlled according to embodiments of the present invention.

FIGS. 3, 4, 5 illustrate graphs showing results when a machine is controlled according to embodiments of the present invention. The abscissas 43 thereby indicate the time, the ordinate 44 of FIG. 3 indicates the DC link voltage Vdc, the ordinate 45 in FIG. 4 indicates the generator torque and the ordinate 46 in FIG. 5 indicates the rotor position. FIGS. 3, 4, 5 thereby illustrate results for a dual three-phase generator, such as is illustrated in a schematic manner in FIG. 1.

The generator DC link voltage in FIG. 3 is indicated with a curve 47. Curve 48 in FIG. 4 illustrates the generator torque, curve 49 denotes the enable signal of the first EMF observer 12_1 and curve 50 denotes the enable signal, for example 40_1 in FIG. 2, of the second EMF observer 12_2. At the point in time where the enable signals 49, 50 go from a low level to a high level, the respective observer starts observing the rotor position. As can be appreciated from FIG. 4, the first EMF observer 12_1 is started at a first point in time 51 which is earlier than a second point in time 52 at which the second EMF observer is started. The delay of the second EMF observer 12_2 is about 0.6 s. As can be observed from FIG. 4, shortly after initiating or starting the first EMF observer 12_1, an undesired dip in the torque 48 is observed. However, a corresponding undesired torque transient is not observed when the second EMF observer 12_2 is started at the point in time 52.

In FIG. 5, the curve 53 indicates the rotor position of the entire machine 2, the curve 54 indicates the first value of the rotor position as determined by the first EMF observer 12_1 and the curve 55 indicates the second value of the rotor position as derived or determined by the second EMF observer 12_2.

Figure 6:
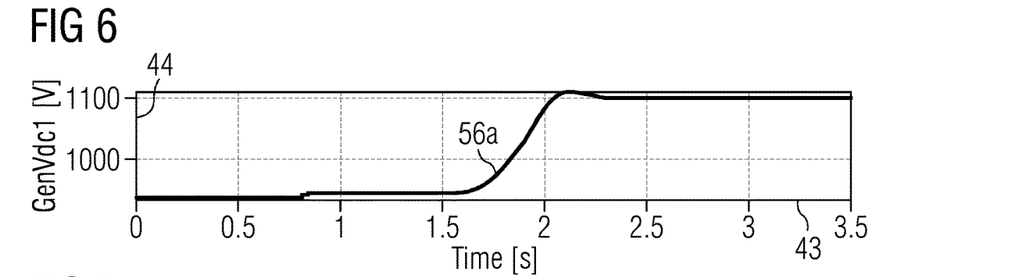
FIG. 6 illustrates results of a conventional system.
Figure 7:
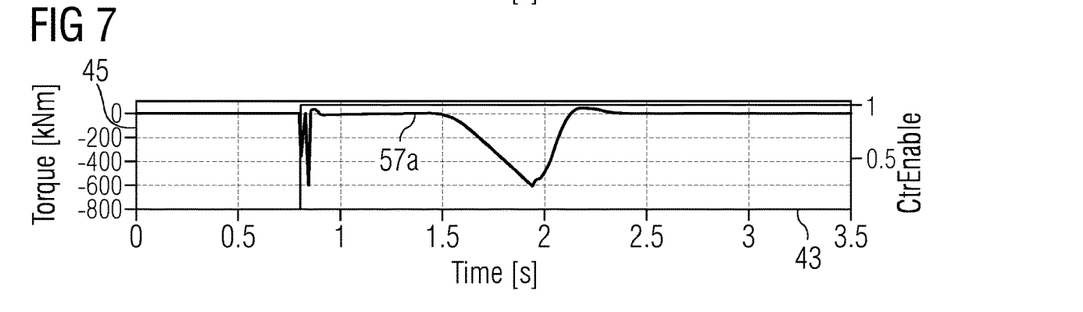
FIG. 7 illustrates results of a conventional system.
Figure 8:
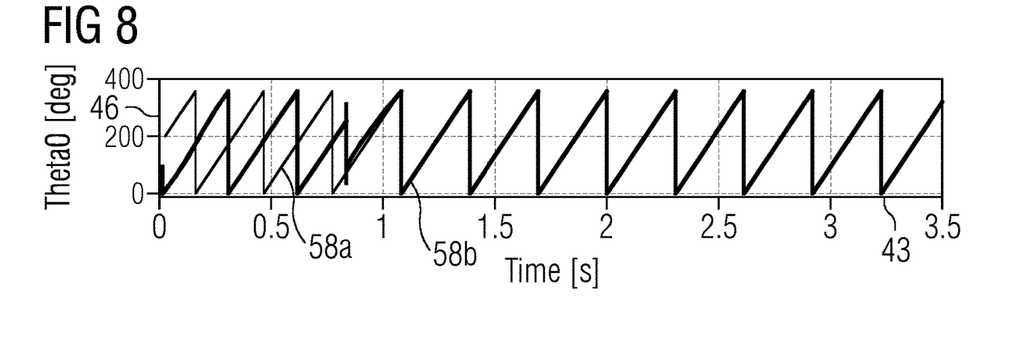
FIG. 8 illustrates results of a conventional system.

In FIG. 3, 4, 5 is a result with proposed sensorless scheme for a dual three-phase generator, in comparison with the result with the existing method, FIGS. 7, 6, 8. With the conventional method, the voltage sensorless synchronization for both channels are enable at the same time, as indicated by the signals of "CtrEnable", and as a result the transient torque will be contributed from both channels and is pretty high. Since both DC links are being charged together, the variation in gen torque will be quite high too, though this may not be generally considered as a problem and can also be managed by the DC link controller.

With the proposed method (FIG. 3, 4, 5), the synchronization for one channel is started first (at 51 in FIG. 4), and due to the incorrect initial voltage angle, there will be some torque transient, but the level is much reduced (or halved for a dual channel machine, or quartered for a quad channel machine, for example). After the completion of synchronization of this channel, the other channel is started (at 52) with use of the first value of the observed angle as the initial voltage angle. Then, there will be hardly a torque transient from the synchronisation for this second channel.

Due to difference in time, the two DC links will be charged up from the generator side separately. This would have the effect of reduced torque for charging, but occurring twice.

However, it should be mentioned that the separate DC link charging is not necessarily associated with observer synchronization process.

In a multiple three-phase generator system, one channel may be defaulted as the master, to which the voltage sensors may be interfaced. In the case of reduced converter (channel) operation, the master-slave configuration shall be maintained, and the voltage sensors may have to be mapped to the master channel in software implementation, with adjustment in phase shift if necessary (e.g., 30 deg). At any combinations of the sensorless solution, only one portion of torque transient may present.

The FIGS. 6, 7, 8 illustrate results of a conventional system. Thereby, the voltage in FIG. 6 is labelled with reference sign 56a, the torque in FIG. 7 is labelled with reference sign 57a and the rotational position of the plant is labelled with reference sign 58a and that of the second channel with reference sign 58b. As can be appreciated from FIG. 7 compared to FIG. 4, the torque transient of the curve 57a is more pronounced than the smaller torque transient of the curve 48 which is resulting from performing a method according to an embodiment of the present invention.

Figure 9:
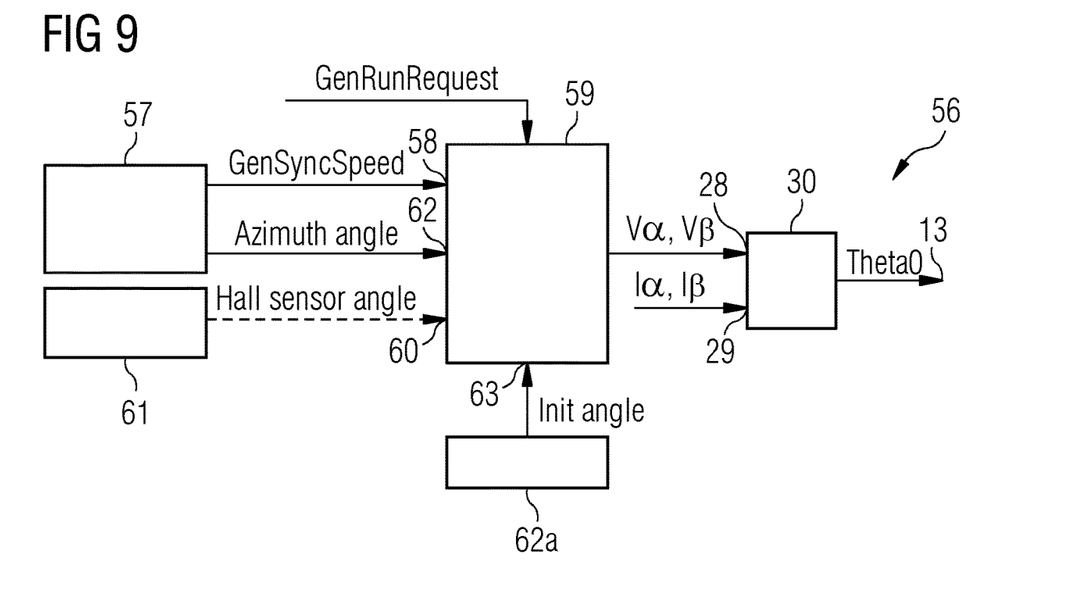
FIG. 9 schematically illustrates a controller according to another embodiment of the present invention.

FIG. 9 schematically illustrates a controller according to another embodiment of the present invention. The controller 56 illustrated in FIG. 9 may in one embodiment replace the first control portion 15_1 illustrated in FIG. 1. According to another embodiment, the controller 56 illustrated in FIG. 9 may replace (entirely or partly) the first EMF observer 12_1 illustrated in FIG. 1.

The controller 56 comprises a turbine controller 57 deriving and supplying a generator synchronous speed signal 58 to a synchronization module 59. The synchronization module 59 may be configured similarly as the synchronization module 26_1, 26_2. Instead or additional to using sensed voltages of the winding set, the synchronization module 59 may receive an electrical angle 60 for the generator from a set of Hall-sensor 61. The turbine controller 57 may output an azimuth angle 62 which is also received by the synchronization module 59, and converted into an electrical angle for the generator.

An HFI (high frequency injection) observer 62a outputs also an initial angle 63 which is also received by the synchronization module 59. Based on the measured generator electrical angle 60 from Hall-sensor, and/or the initial angle 63 from the HFI observer 62, and/or the azimuth angle 62 from the turbine controller 57, the synchronization module 59 derives estimated winding voltages 28. The estimated winding voltages 28 and the currents 29 are received by an EMF observer 30 which derives therefrom a value 13 of a rotor position.

Apart from the generator synchronous speed, the turbine controller also measures the rotor Azimuth angle. In the set-up of some generator control systems, an additional set position sensors may be available, for example Hall sensors. These extra information can be helpful in the voltage sensorless synchronisation as illustrated in FIG. 9.

In contrast to Eq. 2, the required voltages for the EMF observer can be calculated as follows:

$$\begin{cases} V_\alpha = \gamma \cdot \sqrt{2} \omega_e \psi_{pm} \cos(\omega_e t + \theta_0) \\ V_\beta = \gamma \cdot \sqrt{2} \omega_e \psi_{pm} \cos\left(\omega_e t - \frac{\pi}{2} + \theta_0\right) \end{cases} \quad (4)$$

Where θ0 is the initial angle. Instead of being initialised to 0 (as given in Eq. 2), at enabling of the synchronisation, the initial angle θ0 can be set from the Azimuth angle reading, or from the Hall sensor measurement, or a saliency based position observer (e.g., HFI). Usually the Azimuth angle has a resolution of ~0.2 mechanical degree, or ~15 degree in electrical angle for a typical generator.

Figure 15:
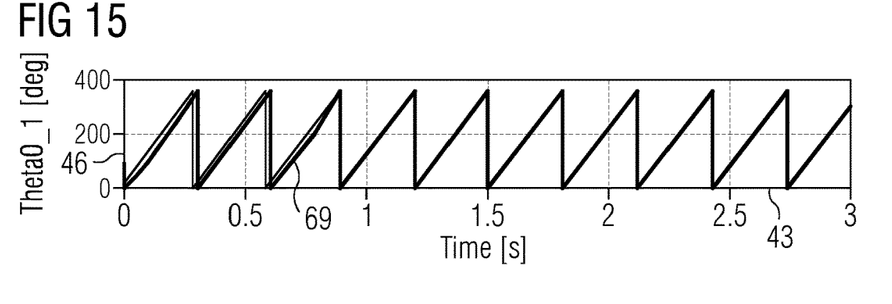
FIG. 15 illustrates results with a 30° error in the initial angle.

Depending on the application, the Azimuth angle may be communicated from the turbine controller to the generator controller, and an extra error in angle could be resulted from comms latency, which could be as high as 40 electrical degrees in a typical set-up. In theory, the angle error due to comms latency can be compensated, however, as this kind of latency often has a large non-deterministic content, the compensation won't be complete. If the latency is assumed to have a ±50% variation, the angle error would be within (−20, 20) electrical degrees. Therefore, the total error in the received Azimuth angle can be about 35 degrees, which is not believed to cause much torque transient at synchronisation, as shown in FIG. 15. The measurement of electrical angle by Hall sensors (e.g. three digital Hall effect sensors) is a little coarse, and the accuracy can be within (−30, 30) degrees. Due to the fairly accurate initial angle, there is no need of voltage scaling-down anymore, i.e., γ=1.

A typical saliency position observer is based on high frequency injection (HFI). This observer can be momentarily enabled when the generator is stationary or running at low speed, and the resulted angle θhfi, together with the synchronous speed from the turbine controller ωsync, can be used to provide the initial angle in Eq (4), which is to be used by the EMF observer, i.e., $$\theta_0 = \theta_{hfi} + \int \omega_{sync} dt \quad (5)$$

Figure 10:
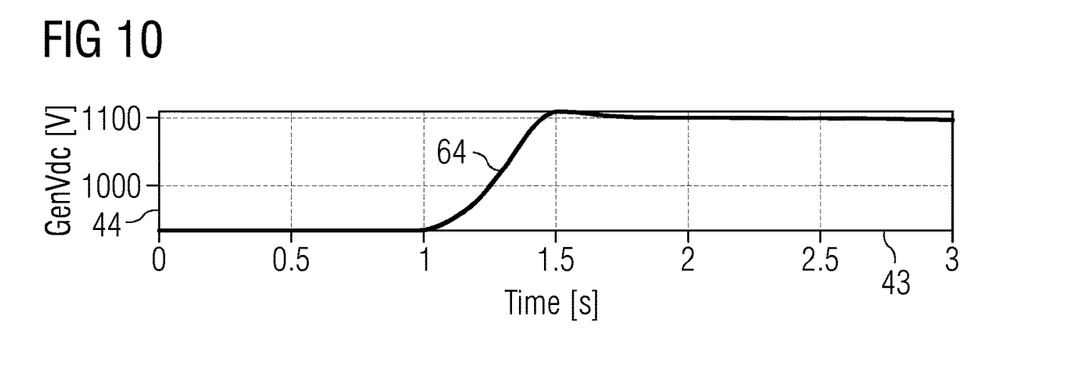
FIG. 10 illustrates results of using a controller as illustrated in FIG. 9.
Figure 11:
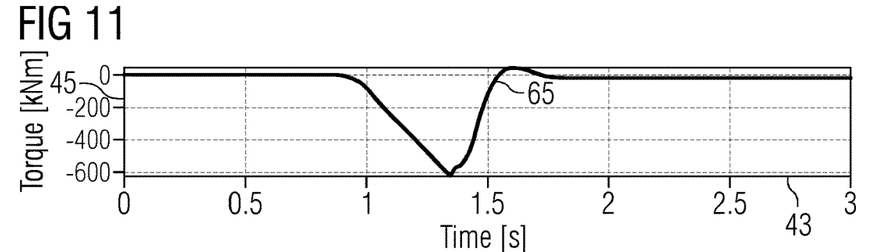
FIG. 11 illustrates results of using a controller as illustrated in FIG. 9.
Figure 12:
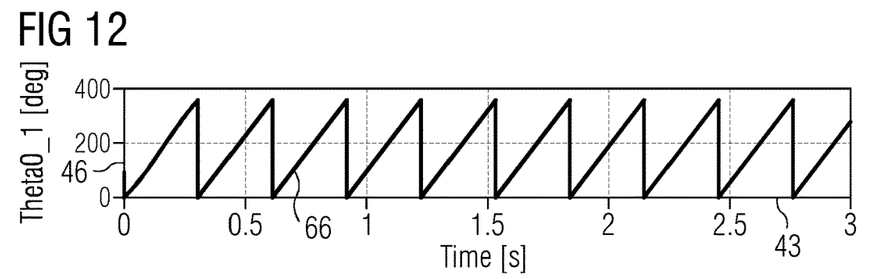
FIG. 12 illustrates results of using a controller as illustrated in FIG. 9.

FIGS. 10, 11, 12 illustrate results of using a controller 56 as illustrated in FIG. 9. Abscissas 43 and ordinates 44, 45, 46 are as described with reference to FIGS. 3, 4, 5, respectively.

Figure 13:
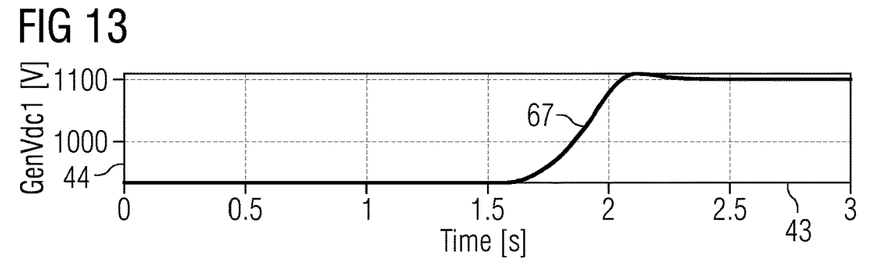
FIG. 13 illustrates results with a 30° error in the initial angle.
Figure 14:
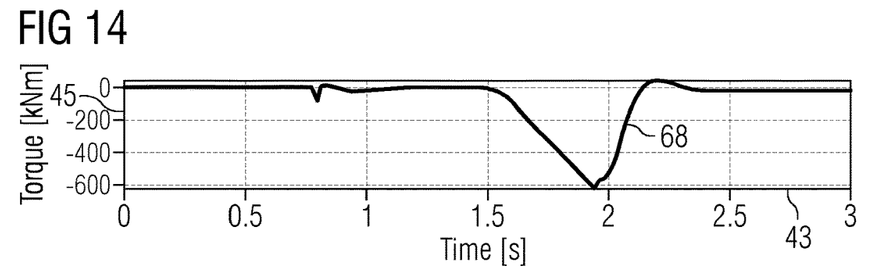
FIG. 14 illustrates results with a 30° error in the initial angle.

The FIGS. 10, 11, 12 illustrate results with no error in the initial angle and FIGS. 13, 14, 15 illustrate results with a 30° error in the initial angle (for example from the Hall-sensor measurement).

The generator DC link voltage in FIG. 10 is labelled with reference sign 64. The torque in FIG. 11 is illustrated with reference sign 65 and the rotor position in FIG. 12 is indicated with reference sign 66.

In FIG. 13, the DC link voltage is labelled with reference sign 67, in FIG. 14 the torque is labelled with reference sign 68 and in FIG. 15, the rotor position is labelled with reference sign 69.

It can be shown in FIG. 11 that due to use of accurate voltage initial angle, there will be hardly a transient in the generator torque from the voltage sensorless synchronisation, and the performance is very similar to that with the voltage sensored method. Even with an initial angle error of 30-degree by use of the Hall sensors (FIG. 14), the transient torque is much reduced in comparison with that when the normal sensorless method is used.

For starting and low speed operation of an electrical machine, often the HFI (High Frequency Injection) is applied for position and speed observation, thus an HFI observer (being an example of a position observer). The technique relies on the machine saliency resulting from either geometrical rotor saliency or magnetic saturation saliency.

Figure 16:
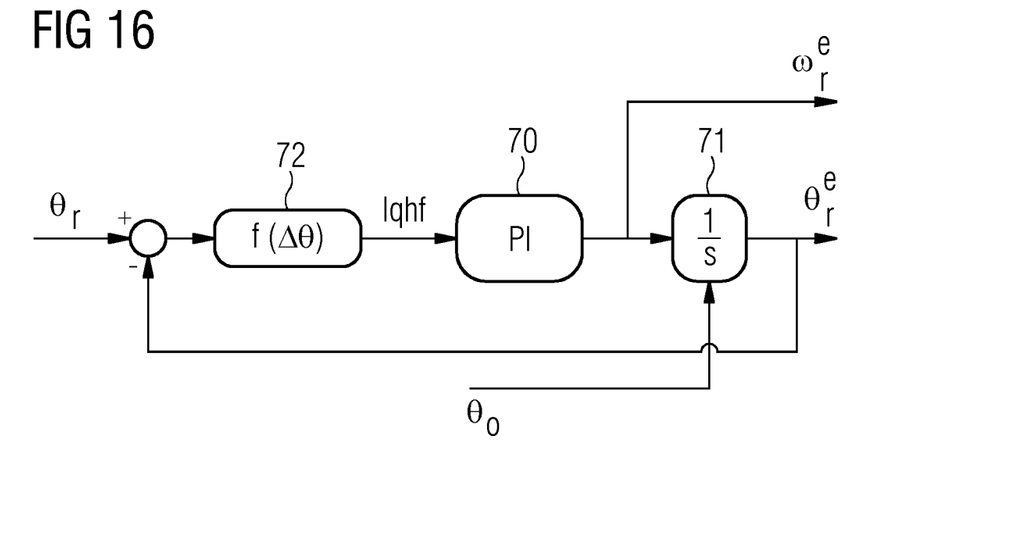
FIG. 16 illustrates an HFI-technique associated with an HFI observer.

One of the commonly applied approaches is, high frequency pulsating sinusoidal voltage injection on d-axis. The resulted high frequency component in q-axis current is used as a feedback for speed and position observation, which is related with the position angle error by, $$I_{qhf} = k \sin(2\Delta\theta) \quad (6)$$

Where k is a factor what is dependent on the high frequency injection voltage amplitude and frequency, and machine parameters such as saliency.

FIG. 16 is an illustration of the HFI-technique associated with an HFI observer. If there is an angle error AO, the feedback 72 (according to eq. (6)) of Iqhf won't be zero, and the PI regulator 70 would act to correct the speed estimation, until the angle error reaches zero. The estimated speed can be used for angle derivation by integration. Usually, the integration by module 71 starts at value of 0, while the real machine angle may be quite far away from this. Therefore, often there is a transient at the start (or synchronisation) of the HFI observer, which could lead to disturbance in current and torque, etc.

By setting the initial angle $\theta_0$ with one of the proposed embodiments, that is, with the external value from e.g. an Azimuth angle sensor, Hall sensor measurement, or observed value from the first observer, the HFI observer will be synchronised with little transient.

Also, as noted from the above equation, there is an ambiguity of 180 degree. This is normally handled by a method of polarity detection. However, with the proposed technique, the polarity detection may be saved, or run more robustly.

Embodiments of the present invention may be particularly advantageous if the drive system is less tolerant to torque transient. In addition, it will allow simultaneous synchronisation of multiple three-phase generators if it is desirable.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating an electrical synchronous machine comprising a rotor and a stator having a first winding set and at least one second winding set, the method comprising:
   using a first position observer configured to observe the first winding set in order to observe a first value of rotor position;
   synchronizing the machine based on the first observed value or an external initial value of the rotor position, wherein operating the machine comprises:
   controlling a first converter based on the first observed value of the rotor position, the first converter being connected to the first winding set; and
   synchronizing a second converter based on the first observed value of the rotor position, the second converter being connected to the second winding set.

2. The method according to claim 1, wherein controlling the machine comprises:
   using a second position observer configured to observe the second winding set in order to estimate a second observed value of the rotor position, thereby using the first observed value of the rotor position as initial second observed rotor position for starting;
   controlling the second converter based on the second observed value of the rotor position.

3. The method according to claim 2, wherein the second position observer is started at a second point in time, which is a time interval after starting the first position observer at a first point in time,
   the method further comprising:
   controlling the first converter starting at the first point in time;
   controlling the second converter starting not earlier than at the second point in time.

4. The method according to claim 3, wherein at the second point in time at least one of the following holds:
   synchronisation of the first position observer is completed;
   the first position observer is in a running state;
   torque is produced by the first winding set on demand;
   the first observed value of the rotor position observed by the first position observer substantially corresponds to a true value of the rotor position.

5. The method according to claim 2, wherein one or each of the first position observer and the second position observer comprises an EMF observer comprising:
   a sychronization module having as inputs at least one of the following:
   an observed rotor speed;
   an observed rotor position;
   respective winding set control voltage references;
   a rotor initial position for initializing the first position observer and/or the second position observer;
   a generator synchronous speed;
   sensed winding set voltages used in a sensored mode;
   a generator electrical angle from rotor azimuth position, Hall-sensor measurement, or HFI sensorless observer;
   the synchronization module having as outputs estimated winding voltages in a fixed alpha-beta frame or a fixed abc-frame;
   an observer module having as inputs at least one of the following:
   estimated winding voltages;
   estimated/measured winding currents;
   the observer module having as output at least an observed value of the rotor position and speed.

6. The method according to claim 5, wherein the first observed value of the rotor position output from the observer module of the first position observer is used as input for the rotor initial position of the synchronization module of the second position observer.

7. The method according to claim 1, wherein one or each of the first position observer and the second position observer comprises a HFI observer.

8. The method according to claim 1, wherein at least the first position observer is operated in:
   a voltage sensorless mode, in which a generator synchronous speed and a predetermined initial rotor position are used as synchronization module inputs, without supplying sensed winding voltages as input;
   a voltage sensored mode, in which sensed winding voltages of at least one winding set are used as synchronization module inputs.

9. The method according to claim 1, wherein at least the first position observer is operated in:
   a mode, in which a generator initial angle as synchronization module input is provided from a separate source, selected from at least one of: rotor azimuth position, Hall-sensor measurement result and HFI sensorless observer result.

10. The method according to claim 1,
    wherein the first position observer is operated in a voltage sensorless mode or sensored mode,
    wherein the second position observer is operated in the voltage sensorless mode.

11. The method according to claim 1, wherein the first observed value of the rotor position and/or a second observed value of the rotor position is an electrical position of the rotor.

12. The method according to claim 1, wherein the machine is a permanent magnet synchronous machine having at least one winding set.

13. A controller for operating an electrical synchronous machine comprising a rotor and a stator having a first winding set and at least one second winding set, the controller comprising:
    a first position observer configured to observe the first winding set in order to observe a first value of the rotor position;
    a control portion configured to synchronized and/or control the machine based on the first observed value of the rotor position,
    the control portion comprising:
    a second position observer configured to observe the second winding set in order to observe a second value of the rotor position, thereby using the first observed value of the rotor position for starting.

14. A wind turbine, comprising:
an electrical synchronous machine comprising a rotor and a stator having a first winding set and at least one second winding set, the rotor being coupled to a hub at which plural rotor blades are mounted; and
a controller comprising:
  a first position observer configured to observe the first winding set in order to observe a first value of the rotor position;
  a control portion configured to synchronized and/or control the machine based on the first observed value of the rotor position,
the control portion comprising:
a second position observer configured to observe the second winding set in order to observe a second value of the rotor position, thereby using the first observed value of the rotor position for starting, connected to control the machine.

* * * * *